United States Patent Office 3,558,424
Patented Jan. 26, 1971

3,558,424
THERMOPLASTIC POLYESTER RESIN FILMS BONDED TOGETHER TO FORM A LAMINATE USING CERTAIN DIHYDROXY BENZENE COMPOUNDS AS THE BONDING AGENT
Edward Peter Weierter, Massapequa, N.Y., assignor to American Cyanamid Company, Stamford, Conn., a corporation of Maine
No Drawing. Filed Aug. 27, 1968, Ser. No. 755,713
Int. Cl. B32b 27/36; C09j 3/16
U.S. Cl. 260—33.4                                                    8 Claims

ABSTRACT OF THE DISCLOSURE

A laminate comprising two layers of a film of a linear thermoplastic polyester resin bonded together by means of a bonding layer of a compound having the formula:

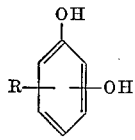

wherein R is a member selected from the group consisting of hydrogen, alkyl groups containing from 1 to 4 carbon atoms, chlorine and bromine.

BACKGROUND OF THE INVENTION

Thermoplastic linear polyester resin films are commercially available from a plurality of sources and a plurality of methods have been devised to accomplish a bonding of one such linear thermoplastic polyester film to another film of the same description. Some adhesives have been used for this purpose and in other instances merely the application of heat and pressure have been used to accomplish the bonding.

FIELD OF THE INVENTION

The present invention is in the field of bonding two or more layers of a linear thermoplastic polyester resin film together to form a laminated article by use of certain dihydroxy benzene compounds as the bonding agent. These films can be bonded together to produce a flat laminated article or a single unitary film can be formed into an open-ended tube by bonding one pair of the opposite edges of said film by use of the dihydroxy benzene compounds as the bonding agent.

DESCRIPTION OF THE PRIOR ART

The instant applicant is not aware of any reference which is truly pertinent to the present invention.

SUMMARY OF THE INVENTION

This invention relates to a laminate comprising two layers of a film of a linear thermoplastic polyester resin bonded together by means of a bonding layer of a compound having the formula:

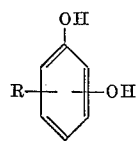

wherein R is a member selected from the group consisting of hydrogen, alkyl groups containing from 1 to 4 carbon atoms, chlorine and bromine. More particularly, this invention relates to a laminate in which the film used is a unitary film which has one pair of its opposite edges bonded together by use of a dihydroxy benzene compound as the bonding agent in an overlapping arrangement to form an open-ended tube. The dihydroxy benzene compounds as used in the present invention may be applied as neat compound or may be applied from an organic solvent solution thereof to the area of the film which is to be bonded to another area of the same or a different film; and upon evaporation of the solvent, the two layers to be bonded together are placed in superimposed relationship and by the application of sufficient heat to soften or melt the dihydroxy benzene compound and upon application of sufficient pressure so as to bring the two films and the bonding agent into contact with one another, the laminate is produced. In making the laminate of the present invention, one may use a batch or continuous process and for the purposes of the present invention as will be outlined in greater detail hereinbelow a continuous process is preferred.

Reference is made to the United States Pat. 3,329,173, Skoggard and Post, issued July 4, 1967, which discloses a flattened, re-expandable, reinforced pipe which is prepared by wrapping glass fibers coated and/or impregnated with a thermosetting resin around a collapsible mandrel wherein said mandrel is a tubular film of a thermoplastic material. Said patent is incorporated herein by reference. Although this tubular mandrel may be any one of a plurality of thermoplastic films which have been formed into the shape of a tubular member, it is preferred that the thermoplastic tubular member be a linear thermoplastic polyester resin film such as those prepared by reacting a glycol such as ethylene glycol with a dicarboxylic acid free of non-benzenoid unsaturation such as terephthalic acid. These linear thermoplastic polyester resin films are available commercially from a plurality of sources. To produce the laminates from these thermoplastic films, one merely applies the selected dihydroxy benzene compound to the surface of the film in the area where bonding is to be achieved and the second layer of film is superimposed thereon and heat and pressure are applied to the superimposed structure so as to achieve the bonding of the films together. The amount of heat applied should be sufficient to provide for the softening or melting of the dihydroxy benzene compound but insufficient to melt the linear polyester resin film. Since the dihydroxy benzene compounds soften or melt at a temperature significantly lower than the softening and melting temperature of the polyester film, no problem is encountered in accomplishing the bonding step. Although, it has been stated hereinabove, the dihydroxy benzene compound can be used directly in an undiluted state, a more uniform layer of the dihydroxy benzene compound can be applied to the area where bonding is to be accomplished by utilizing an organic solvent solution of the dihydroxy benzene compound which is applied to the area of bonding and the solvent may then be flashed off by the application of heat leaving a uniformly deposited film of the dihydroxy benzene compound on the polyester resin film. Thereafter the superimposition of the second layer of the polyester resin film to the treated first layer followed by the application of heat and pressure achieves an excellent bond. The dihydroxy benzene compound either in a neat condition or in an organic solvent solution can be applied to either or both faces of the polyester resin film which are to be contacted with one another and bonded together. However, for practical purposes it is necessary only to apply the dihydroxy benzene compound to one surface of one of the films and preferably the upper surface of the lower film.

Among the dihydroxy benzene compounds which may be used in preparing the laminated structure of the present invention are ortho-dihydroxy benzene otherwise known as pyro-catechin, also known as catechol, meta-dihydroxy benzene otherwise known as resorcinol and para-dihydroxy benzene otherwise known as hydroquinone. These three compounds are preferred because of their commercial availability in adequate quantities and because of their comparatively low prices. However, substituted dihydroxy benzene compounds can readily be used for this purpose wherever available such as dihydroxy benzene compounds substituted in any of the available positions on the ring by an alkyl group containing from one to four carbon atoms such as tertiary butyl catechol, or by a halogen atom such as chlorine and bromine, such as chloro hydroquinone, 4-chloro-resorcinol, bromo hydroquinone and 2-bromo resorcinol.

It has been indicated hereinabove that it is preferred to make use of an organic solvent solution of the dihydroxy benzene compound in applying a bonding layer thereof to the linear thermoplastic polyester resin film. Any organic solvent in which these dihydroxy benzene compounds are soluble can be used. The solvent selected should have a boiling point below the boiling point of the dihydroxy benzene compound. Particularly suitable for such purpose are the ketones such as acetone, methyl ethyl ketone, diethyl ketone, methyl isopropyl ketone, and the like. The methyl ethyl ketone is preferred because of its availability and comparatively low cost. The amount of solids present in the solution is not critical and may be varied over a substantial range. However, in order to achieve the deposition of a uniformly thin film layer on the polyester resin film, a low solids solution of the dihydroxy benzene compound should be used such as about 10% to 30% of the dihydroxy benzene compound by weight based on the total weight of solution. Preferably one would use about 20% solids solution. The unsaturated polyester resin films used in the present invention vary in thickness over a comparatively narrow range and are available commercially in thicknesses of 0.5 mil to 10 mils. As a consequence, the thickness of the dihydroxy benzene compound film on the polyester resin film should be somewhat less than the thickness of the polyester resin film such as about 1 mil down to about 0.1 mil and preferably about 0.5 mil.

In order that the concept of the present invention may be more completely understood, the following examples are set forth.

EXAMPLE 1

A commercially available ethylene-terephthalic polyester resin film, 3 mils thick, is coated on its right edge with a 20% solution of resorcinol dissolved in methyl ethyl ketone. The layer of film is only about ½" wide but extends the entire length of the right edge of the polyester resin film. Upon evaporation of the methyl ethyl ketone a film of resorcinol remains deposited which is about 0.5 mil thick. The left edge of the polyester film is then lifted and brought toward the right edge whereupon the right edge of the film is lifted and brought to the center and the right edge of the film is then superimposed on the left edge of the film and heat and pressure is applied to the juncture at a temperature sufficiently high so as to soften the resorcinol and cause the two edges of the polyester film to become bonded together. Upon cooling the tubular member thus produced is tested for seal and it is found that an excellently bonded seal is achieved.

EXAMPLE 2

Example 1 is repeated in all essential details except that in the place of the resorcinol there is used an equivalent amount of catechol. Again an excellent seal is achieved.

EXAMPLE 3

Example 1 is repeated in all essential details except in the place of the resorcinol there is substituted an equal amount of hydroquinone. Upon evaporation of the solvent, the process is continued to produce the open-ended tubular member. The tubular member is tested for seal and again an excellent seal is achieved.

EXAMPLE 4

The entire upper surface of a sheet of a commercially available ethylene-terephthalic polyester resin film, 3 mils thick, is coated with a 20% solution of resorcinol dissolved in methyl ethyl ketone. The solvent is evaporated to leave a uniform film of resorcinol covering the entire upper surface of the polyester resin film. An untreated film of the same polyester resin is then superimposed on the coated film and the entire assembly is heat and pressure consolidated to a unitary laminated structure. This reinforced laminate is then used in exactly the same manner as the unitary film of Example 1; and upon producing the tubular member, the product is tested for seal and is found to have an excellently bonded seal as well as a stronger reinforced tube.

I claim:

1. A laminate comprising two layers of a film of a linear thermoplastic polyester resin bonded together by means of a bonding layer of a compound having the formula:

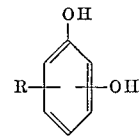

wherein R is a member selected from the group consisting of hydrogen, alkyl groups containing from 1 to 4 carbon atoms, chlorine and bromine.

2. A laminate according to claim 1 in which the film used is a unitary film which has one pair of its opposite edges bonded together in an overlapping arrangement to form an open-ended tube.

3. A laminate according to claim 1 in which the bonding compound is resorcinol.

4. A laminate according to claim 1 in which the bonding compound is hydroquinone.

5. A laminate according to claim 1 in which the bonding compound is catechol.

6. A laminate according to claim 2 in which the bonding compound is resorcinol.

7. A laminate according to claim 2 in which the bonding compound is hydroquinone.

8. A laminate according to claim 2 in which the bonding compound is catechol.

References Cited

UNITED STATES PATENTS

| | | | |
|---|---|---|---|
| 2,982,754 | 5/1961 | Sheffer et al. | 260—33.4 |
| 3,434,916 | 3/1969 | Braunisch et al. | 161—231 |
| 3,444,130 | 5/1969 | Rosenbrock et al. | 260—33.4 |

MORRIS LIEBMAN, Primary Examiner

S. L. FOX, Assistant Examiner

U.S. Cl. X.R.

156—332